UNITED STATES PATENT OFFICE.

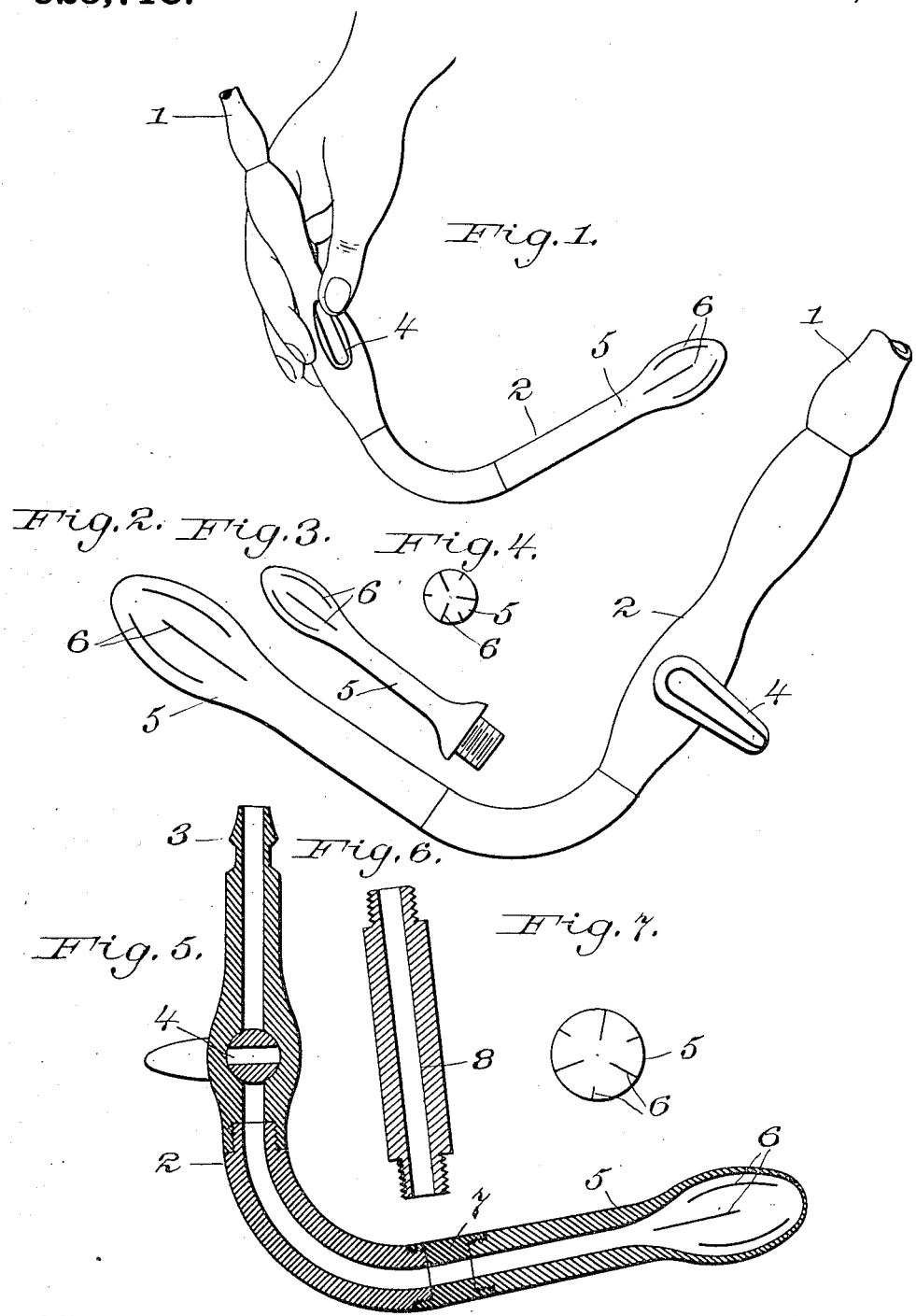
E. T. PEARL.
SYRINGE NOZZLE.
APPLICATION FILED JAN. 2, 1909.
925,718.
Patented June 22, 1909.

EUGENE TULLAR PEARL, OF PASSAIC, NEW JERSEY.

SYRINGE-NOZZLE.

No. 925,718.  Specification of Letters Patent.  Patented June 22, 1909.

Application filed January 2, 1909. Serial No. 470,533.

*To all whom it may concern:*

Be it known that I, EUGENE TULLAR PEARL, a citizen of the United States of America, residing at Passaic, in the county of Passaic and State of New Jersey, have invented new and useful Improvements in Syringe-Nozzles, of which the following is a specification.

My invention relates particularly to vaginal pipes or nozzles which, as ordinarily constructed, consist of a straight or slightly curved pipe about five inches long of rubber or metal, with perforations drilled in and about the end thereof. Some of these nozzles are clumsy, others are grooved with quite sharp edges and frequently have the ends almost squared and the outlets therein carelessly drilled presenting rough edges. Again, metal spraying disks are employed and gouge-like ends are found in some vaginal pipes. All such constructions are objectionable and hurtful, as the nozzles tend to irritate the delicate tissues which form the vaginal lining and cause serious ailment. Metals for nozzles are objected to by physicians, as corrosion of same occurs when medicated injections are employed.

The usual vaginal nozzle is attached to a rubber supply pipe leading from a fountain bag or reservoir and the flow from the same is controlled by a metal shut-off attached to the supply pipe two or three feet above the nozzle. In turning on the flow, a large quantity of air is forced into the vagina often causing serious trouble, and the nozzle cannot be conveniently held in use without the fluid medications and washes passing out from the parts, deluging the hand, which is particularly disagreeable and often offensive.
My improved nozzle overcomes these various defects, is thoroughly sanitary, convenient, and cannot cause the slightest discomfort or injury. It is preferably made from polished hard rubber and is approximately L or V shaped, the outer or exit section thereof being slightly curved and the inner or inlet serving as a handle, is fitted with a hard rubber shut-off which can be opened or closed with the hand holding the nozzle in position. As the shut-off is formed in part with the nozzle the air space in the outlet end is extremely small so that practically no air can be injected, and the fluid and washings passing out from the vagina cannot come in contact with the hand.

With my angularly shaped nozzle, it is impossible to accidentally insert it too far. This often occurs with nozzles such as are commonly used and causes serious complications.

In the accompanying drawings I have shown a nozzle suitable for carrying my invention into effect. I wish it understood, however, that I do not limit myself to either the exact construction or arrangement of parts, as various changes may be made therein without departing from the spirit and scope of my invention.

In the drawings—Figure 1, is a view in elevation showing the nozzle in use. Fig. 2, is an enlarged view of the nozzle showing the valve closed. Fig. 3, illustrates a smaller pipe designed to be used interchangeably with the outer section shown on the nozzle in Fig. 2. Fig. 4, is an end view thereof. Fig. 5, is a sectional view illustrating a modification. Fig. 6, is a similar view of a section for use as an extension between the valved section and the elbow of the nozzle and Fig. 7, is an end view of the nozzle.

Referring now to the drawings—1, represents the lower end of the tubing from the bag or reservoir (not shown) of a fountain syringe—and 2, my improved nozzle, which is reduced at 3 in the usual manner, to permit the tubing to be fitted on the same.

The nozzle is preferably angular, being approximately L or V shaped and is provided at 4, with a valve and at 5, with a removable outer section terminating in a bulb-like tip, in which a number of outlets 6, are formed as narrow slits extending lengthwise thereof as shown. Designed to be used interchangeably with the outer removable section 5, there may be any number of pipes such as is shown in Fig. 3, which may vary in size and shape, etc.

In Fig. 5, a modification is shown in which the removable outer section 5 is flexibly connected to the nozzle proper by an interposed piece of soft rubber tubing 7, and at 8, there is represented an extension piece designed to give more length to the nozzle handle when used by corpulent persons. The ends of both the vaginal and enema pipes are closed the fluid being discharged, as above stated, through longitudinal slits, in the form of thin sheets or films, causing no discomfort should the parts be inflamed. Central outlets in vaginal pipes are condemned by leading gynecologists.

Having, therefore, described my invention, I claim:

1. A syringe pipe externally shaped to serve as a handle and having a valve therein, the stem of which is extended to lie between the thumb and fingers of the hand grasping the handle, a nozzle forming a continuation of the handle and an elbow interposed as a connection between the same.

2. A syringe pipe shaped to serve as a handle and having a valve therein, the stem of which is extended to lie between the thumb and finger of the hand grasping the handle, a nozzle forming a continuation of the handle, said nozzle being closed at its outer end and provided with lateral outlets and an elbow interposed as a connection between the handle and nozzle.

In testimony whereof I affix my signature in the presence of two witnesses.

EUGENE TULLAR PEARL.

Witnesses:
CHEEL BUSCH,
MARY BUSCH.